United States Patent [19]

Darling et al.

[11] Patent Number: 5,092,556
[45] Date of Patent: Mar. 3, 1992

[54] FLAG SUPPORT FOR SPRINKLER SYSTEMS ON GOLF COURSES

[76] Inventors: Gary E. Darling, P.O. Box 719, Sapulpa, Okla. 74066; Patrick J. McMillan, 334 Bradstrom Cir. #101-C, Naples, Fla. 33962

[21] Appl. No.: 497,871

[22] Filed: Mar. 22, 1990

[51] Int. Cl.⁵ .................................. F16M 13/00
[52] U.S. Cl. ................................ 248/519; 248/523; 248/160; 116/173; 116/209
[58] Field of Search ............. 248/160, 519, 523, 539, 248/538; 116/173, 209; 40/598, 607, 608, 612

[56] References Cited

U.S. PATENT DOCUMENTS

| | | | |
|---|---|---|---|
| 1,805,095 | 5/1931 | Horni | 248/523 X |
| 1,845,881 | 2/1932 | Kuehner | 248/512 X |
| 2,596,064 | 5/1952 | Bishop et al. | 116/173 X |
| 2,684,245 | 7/1954 | Jacoby | 116/173 |
| 2,775,221 | 12/1956 | Olson | 116/173 |
| 3,044,435 | 7/1962 | Reardon | 116/209 |
| 3,166,041 | 1/1965 | Caggainello | 116/209 X |
| 3,204,599 | 9/1965 | Milosch | 116/209 |
| 3,240,183 | 3/1966 | Walter et al. | 116/209 X |
| 3,241,516 | 3/1966 | Hopkins | 116/173 |
| 3,436,077 | 4/1969 | Geram | 116/173 X |
| 3,451,370 | 6/1969 | Matesan | 116/209 |
| 3,713,611 | 1/1973 | Voight | 248/160 X |
| 3,843,079 | 10/1974 | Reisling | 248/156 X |
| 4,064,811 | 12/1977 | Copeland | 248/539 X |
| 4,079,559 | 3/1978 | Tenbrummeler | 248/519 X |
| 4,632,354 | 12/1986 | Asciutto | 248/160 X |
| 4,691,892 | 9/1987 | Grewe et al. | 248/160 X |
| 4,700,655 | 10/1987 | Kirby | 116/209 X |

Primary Examiner—Gary L. Smith
Assistant Examiner—Suzanne L. Dino
Attorney, Agent, or Firm—William S. Dorman

[57] ABSTRACT

A flag support for a sprinkler head of the type having a cover plate attached to an internal supporting mechanism by means of one or more screws, the flag support being a two part device consisting of a lower member of plastic material and an upper member of rubber or plastic material which is more resilient and softer than the material of the lower plastic member, the upper rubber member being attachable to the lower plastic member, the plastic member being attachable to the cover plate by a suitable adhesive material and having therein openings of sufficient size and number to permit access to each screw on the cover plate using a conventional screwdriver without requiring the removal of the plastic member from the cover plate, the flag support having a center opening therein substantially equal in diameter to the diameter of the wire or rod of a flag device to be supported on the sprinkler head.

4 Claims, 2 Drawing Sheets

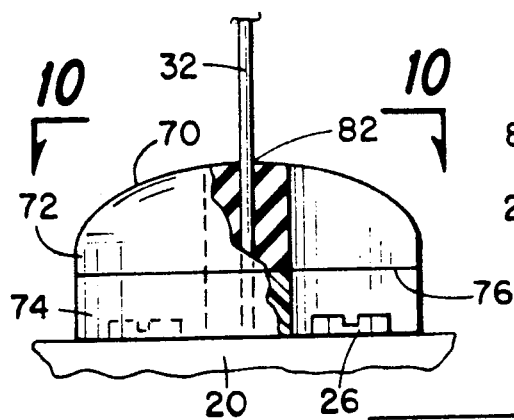
Fig. 9
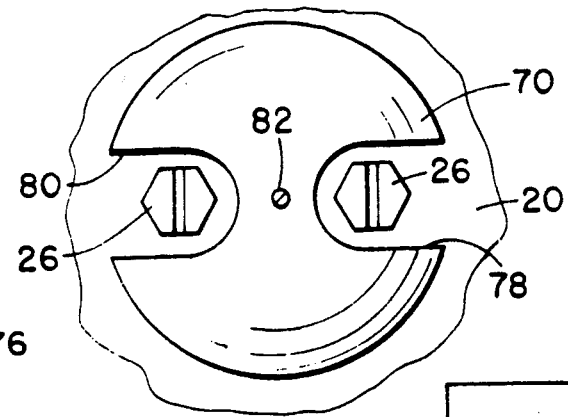
Fig. 10
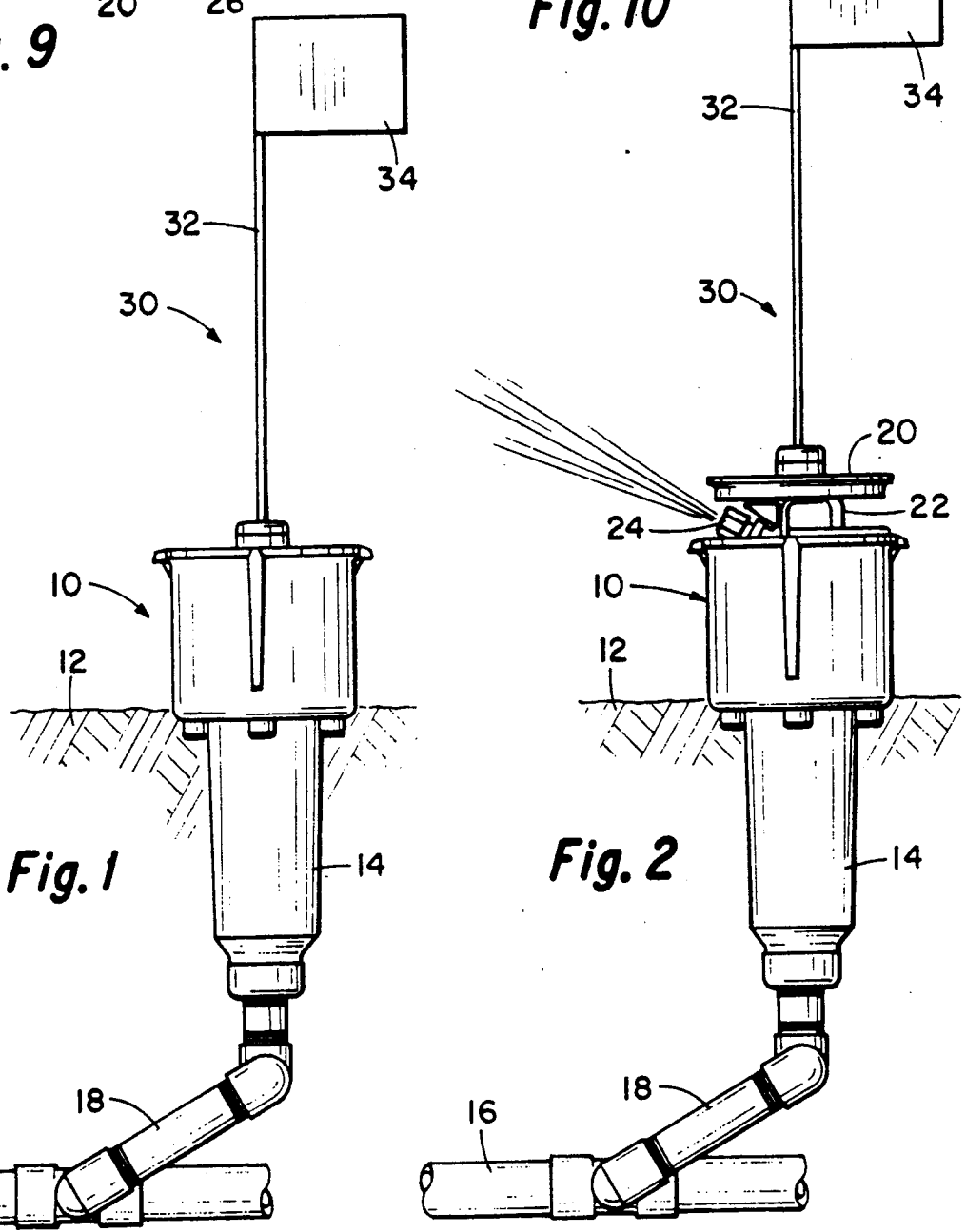
Fig. 1
Fig. 2

FLAG SUPPORT FOR SPRINKLER SYSTEMS ON GOLF COURSES

BACKGROUND OF THE INVENTION

1. Field of the Invention

The present invention relates, broadly, to sprinkler systems which are installed on golf courses. More particularly, this invention relates to a locating means for determining the exact location of each irrigation sprinkler head during the initial stages of the construction of a golf course.

2. The Prior Art

Sprinkling or watering devices are positioned around the green, in various locations along the fairway and even in the "rough" areas. After the golf course becomes operative the tops of the sprinklers are generally flush with the ground. When the sprinkler is actuated, a circular plate of disk at the top of the unit is raised and a spray nozzle under the disk rotates and sprays water over a desired arc (generally 360 degrees) for a predetermined period of time and at predetermined intervals. Also, when the golf course is operative, normal maintenance equipment, such as lawnmowers, etc., can ride over the tops of the sprinkler units without damaging the same.

However, when the golf course is undergoing construction, the sprinkler elements are generally elevated slightly above the existing ground level and are not seated level with the ground until after the course has been completed. During the construction of the golf course, heavy equipment could damage the sprinkler units if it ran into or over the sprinklers. Accordingly, it is standard practice to position flags adjacent the sprinkler heads so that the operators of heavy equipment can avoid the sprinkler heads. The term "flag" as used herein will sometimes be used to refer to pennant or flag portion together with the staff on which the flag or pennant is mounted. These flags are generally 3 to 4 feet high and consist of a wire (with pennant on top) which can be impaled in the ground adjacent the sprinkler head. However, the force of the water from the sprinkler unit itself can sometimes knock over the flag and occasionally the flag can be blown over by wind forces.

With the above in mind, the present invention involves a method of mounting the flag or flag device on the top of the sprinkler unit in such a way that it will be unaffected by the water from the sprinkler unit itself.

A perliminary search was conducted and the following listed U.S. Patents were uncovered in the search:

| Patent Number | Patentee | Date |
| --- | --- | --- |
| 2,413,905 | Blackburn | January 7, 1947 |
| 2,467,908 | Rand | April 19, 1949 |
| 3,044,435 | Reardon | July 17, 1962 |
| 3,166,041 | Caggainello | January 19, 1965 |
| 3,204,599 | Milosch | September 7, 1965 |
| 3,240,183 | Walter et al | March 15, 1966 |
| 3,241,516 | Hopkins | March 22, 1966 |
| 3,451,370 | Matesan | June 24, 1969 |

SUMMARY OF THE INVENTION

A flag support is provided for irrigation sprinkler heads which are used in sprinkler systems for golf courses, parks or other large commercial turf areas where it is desired to establish and maintain a growth of grass. The flag support of the present invention allows the flag or flag device to be supported directly on top of the sprinkler head to minimize the tendency for the flag device to be blown over by the wind or knocked over by the force of water from the sprinkler head itself. The flag support comprises a device which can be glued to the center of the circular cover plate which is mounted on top of the sprinkler head. When the sprinkler is actuated, the cover plate is raised and the supporting mechanism on which the cover plate is mounted is caused to rotate together with the cover plate. A spray nozzle mounted on this supporting mechanism will spray water from under the disk and over a desired arc (generally 360 degrees) for a predetermined period of time. Some of these cover plates are attached to the supporting mechanism by a pair of screws while other cover plates may be attached to the underlying support mechanism by a single center screw. The present invention provides embodiments for both types of cover plate attachments.

One embodiment of the present invention involves a plastic disk which is provided with two larger holes and a smaller central hole. The plastic disk is attached to the cover plate by means of a suitable adhesive so that the two large holes are positioned over the two screws. These holes are sufficiently large that a screwdriver can engage the screws on the cover plate to remove the cover plate without disturbing the plastic disk. A second part of this support involves a plug having a crown portion essentially the same size in diameter as the plastic disk. The plug is also provided with a pair of cylindrical legs of the same external diameter as the internal diameter of the larger holes in the plastic disk. These cylindrical legs are adapted to be received in the larger holes in the plastic disk. The plug is preferably made of rubber or other material which is softer or more resilient than the material in the disk. The plug is also provided with a small center hole which is in alignment with the small center hole of the plastic disk when the plug is received in the plastic disk. The aligned center holes of the plug in the disk are of the same diameter as the wire or rod on which the flag is mounted. Thus, the flag can be inserted through the holes and the plug and the disk and held in position on top of the sprinkler head. Removing the flag device and the plug will permit access to the screws, as indicated above.

A second embodiment of the present invention involves a plug and a plastic plug receiver, made out of the same materials, respectively, as the plug and disk of the first embodiment described above. However, the second embodiment is designed for the type of cover plate which is attached to the underlying supporting mechanism of the sprinkler head by a single center screw. A plug receiver of the second embodiment is provided with a center hole which is adapted to overlie the single center screw on the cover plate but it is sufficiently large to permit access to the screw with a conventional screwdriver. The plug of the second embodiment is provided with a crown portion and a lower cylindrical portion having the same diameter as the hole in the plug receiver. The plug has a center hole of the same diameter as the rod or wire of the flag device.

A third embodiment of the present invention is a two part device, the upper portion of which is made out of rubber and the lower portion of which is made out of plastic. This third embodiment is designed for use in conjunction with the type of cover plate which is attached to the underlying supporting mechanism by a pair of screws. The two parts of this third embodiment are glued together by any suitable glue or adhesive so as to form a unitary device. The sides of the unitary device are provided with two opposite U-shaped openings which extend from the top to the bottom of the device and open outwardly to the sides of the device. These U-shaped openings are positioned over the screws when the device attached to the cover plate by any suitable glue or adhesive. With this third embodiment, access to the screws is permitted with a conventional screwdriver without having to remove any part of the flag support.

BRIEF DESCRIPTION OF THE DRAWINGS

FIG. 1 is an elevation of a sprinkler head or unit slightly elevated above ground level and showing a flag and the flag support of present invention attached to the sprinkler unit;

FIG. 2 is a view similar to FIG. 1 showing the cover plate at the top of the sprinkler unit in raised position with the internal nozzle spraying water out from beneath the cover plate of the sprinkler unit;

FIG. 9 is a view of a still further embodiment of the present invention with certain parts being broken away and in section; and FIG. 10 is a plan view of the elements shown in FIG. 9 as they would appear looking along line 10—10 of FIG. 9.

DETAILED DESCRIPTION OF THE PREFERRED EMBODIMENTS

Figure 3:
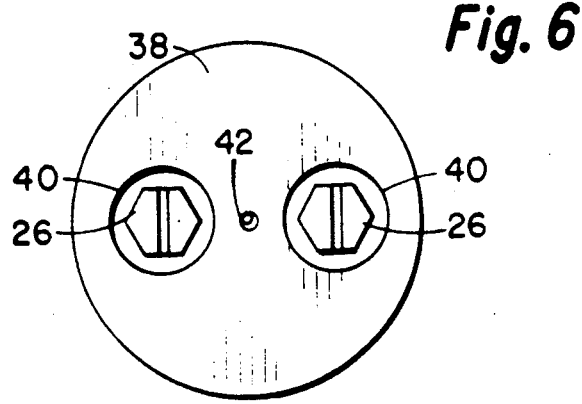
FIG. 3 is a plan view of a cylindrical plastic member which is used in one embodiment of the present invention and which is adapted to be received on the cover plate of the sprinkler unit over the screws which hold the cover plate to the sprinkler unit.

Referring to the drawings in detail, FIG. 1 shows an irrigation sprinkler head or unit 10 which is slightly raised above the ground 12 which, for example, could represent the ground on a golf course. The bottom portion 14 of the sprinkler head connects with a supply pipe 16 through a swing joint 18. This arrangement is considered to be conventional and is the normal position for a sprinkler head during the construction of golf courses, parks, or large commercial turf areas. When the construction of the golf course, park, etc., is later completed, the sprinkler head 10 is lowered into the ground by pivoting the lower end of the unit around the swing joint 18 so that the upper surface of the sprinkler head is at ground level. However, the present invention has particular utility when the sprinkler head is in the position shown in FIGS. 1 and 2 so as to protect the sprinkler heads from damage which might be occasioned by impact from construction equipment. The use of the flag on the sprinkler head will warn the operators of the construction equipment away from the sprinkler heads.

As shown in FIG. 2, the top of the sprinkler head is provided with a circular cover plate 20 which can be raised above the body of the sprinkler head together with an internal and rotatable frame 22 which supports a nozzle 24. When water pressure is supplied to the unit 10 to raise the cover 20 and rotatable support 22, a stream of water sprays out of the nozzle 24. Also, the water pressure will cause the internal frame 22 to rotate together with the nozzle 24 and the plate 20.

In the embodiment shown in FIGS. 3 to 5 and 9 and 10, the cover plate 20 is attached to the internal frame by means of a pair of screws 26. In the embodiment shown in FIGS. 6 to 8, cover plate 20 is connected to the internal frame 22 by means of a single central screw 28.

Before discussing the different embodiments of flag supports disclosed herein, attention is directed to the flag devices 30 which are shown in FIGS. 1 and 2. These flag devices comprise an elongated wire, rod or staff 32 which is generally 3 to 4 feet in length. A pennant or flag 34 is attached to the upper end of the rod or staff 32. Prior to the present invention, the flag devices 30 were positioned adjacent the sprinkler heads 10 for the purpose of alerting the heavy equipment operators as to the presence of the sprinkler heads. The positioning of these flag devices was accomplished by inserting the lower end of the rod or wire 32 into the ground near or adjacent a sprinkler head 10. However, when the sprinkler head was turned on, the water from the nozzle 24 would frequently knock over the flag device. Also, depending upon the firm nature of the ground in which the rod 32 was impaled, a strong wind could blow over a flag device. Thus, the lack of a visible flag device might lead of the accidental damage or destruction of a sprinkler head.

Figure 4:
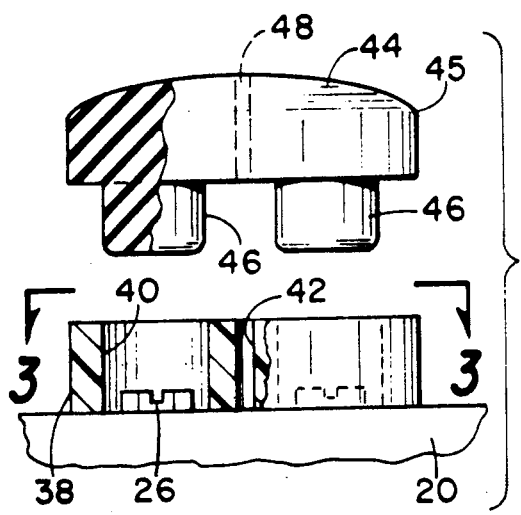
FIG. 4 is an exploded elevation of the plastic member shown in FIG. 3 and further showing rubber plug which is received in the plastic member and with portions of the members being broken away and in section.
Figure 5:
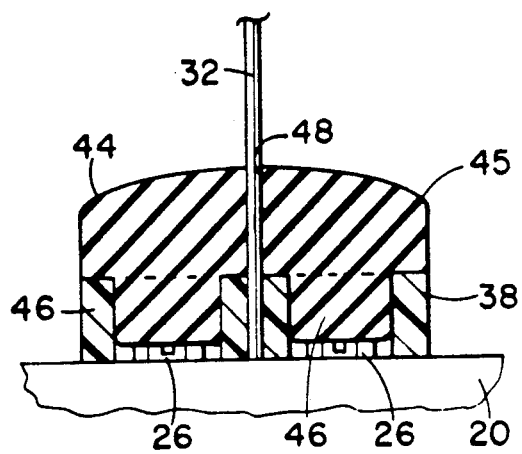
FIG. 5 is a sectional view of the elements shown in FIG. 4 with the plug being received in the plastic member.

Referring now to FIGS. 3, 4 and 5, the flag holder shown in these figures is a two part support consisting of a narrow cylinder or disk 38 made of relatively rigid plastic material. The disk 38 is provided with 2 large holes 40 which are adapted to overlie the two screws 26 which hold the cover 20 of the sprinkler head to the internal frame structure 22. The bottom surface of the disk is attached to the cover plate 20 by means of suitable adhesive (not shown) while positioning the holes 40 concentrically over the screws 26. It should be noted that the holes 40 are sufficiently larger in diameter than the heads of the screws 26 that a screwdriver (not shown) can be used to engage the screws 26, if desired. The disk 38 is also provided with a smaller central hole 42. The diameter of this hole 42 will be equal to the diameter of the rod or wire 32. A plug 44, preferably made of rubber or other material which is softer or more resilient than the material of the disk 38, is provided with an upper dome-shaped portion 45 and a pair of cylindrical legs 46 which are adapted to be received in the holes 40. The plug 44 is provided with a central hole 48 which is also of the same diameter as that of the rod or wire 32. The hole 48 will be in alignment with the hole 42 so that the rod or wire 32 will pass all the way through the aligned holes 42 and 48 until the lower end of the rod rests against the cover 20. When the rod 32 is fully received within the holes 42 and 48, as also shown in FIGS. 1 and 2, the flag device is more securely supported than if the end of the rod was merely impaled in the earth. Furthermore, when the cover 20 is elevated as shown in FIG. 2, the spray from the nozzle 24 will be unable to reach the flag device 30 so as to knock it over.

Figure 6:
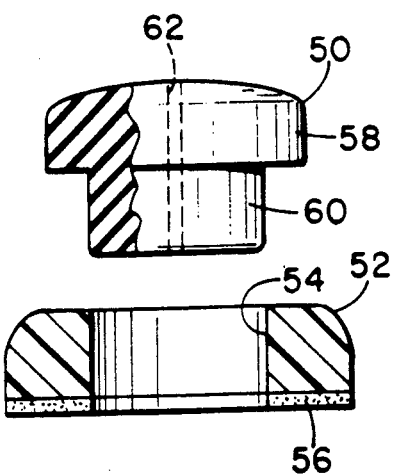
FIG. 6 is an exploded view of another embodiment of the present invention with certain parts in section.
Figure 7:
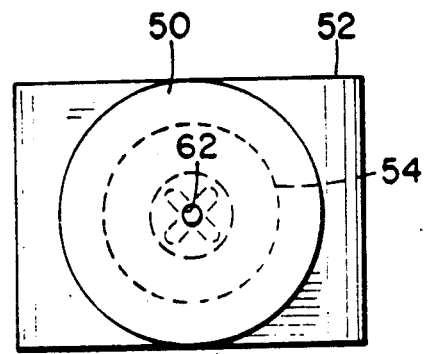
FIG. 7 is a plan view of the elements shown in FIG. 6 but in interfitting relationship as they would appear looking along section line 7—7 of FIG. 8.
Figure 8:
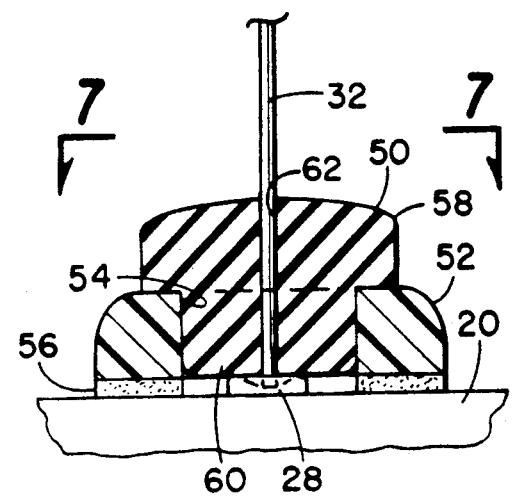
FIG. 8 is a cross-sectional view of the same elements shown in FIG. 6 with the rubber plug being fully received in the plastic member.

Turning now to a consideration of FIGS. 6, 7 and 8, these figures show another embodiment of the present invention which includes a plug 50 and a plug receiver 52. Plug receiver 52, which is made out of plastic material, is rectangular in shape. However, this shape is not critical and the receiver could well be round. Nevertheless, the receiver is provided with a central hole 54 which is adapted to overlie the single screw 28 as shown in FIG. 8. When using this embodiment of flag support with the type of sprinkler head which employs a single central screw to attach the cover 20 to the internal frame 22 of the sprinkler head, the receiver 52 can be attached to the surface of the cover 20 by means of a suitable layer of adhesive 56 so that the hole 52 is disposed concentrically over the screw 28. The plug 50 is provided with an upper crown portion 58 and a lower cylindrical portion 60 of reduced diameter as compared to that of the crown portion 58. The outer diameter of the cylindrical portion 60 is equal to the diameter of the hole 54. The plug 50 is also provided with a small central vertical hole 62 which extends for the full height of the plug 50. The diameter of the hole 62 is equal to the diameter of the rod 32. When the plug 50 is received in the hole 54 of the receiver 52 and the rod 32 is inserted into the hole 62, as shown in FIG. 8, the same relationship will exist between the flag device 30 and the sprinkler head 10 as shown in FIGS. 1 and 2. The plug 50 is made of rubber or other suitable material which is softer and/or more resilient than the material of the receiver 52.

FIGS. 9 and 10 represent a further embodiment of the present invention. These figures disclose a flag holder 70 which is a two part device consisting of an upper portion 72 made out of rubber and a lower portion 74 made out of plastic. The two parts are glued together along the mating surface 76 by any suitable glue or adhesive so as to form a unitary device. U-shaped openings 78 and 80 extend from the top of the holder 70 to the bottom through both portions 72 and 74. These U-shaped openings also extend to the outer circumference of the flag holder 70. When the flag holder 70 is positioned on the cover 20 and held in place by a suitable cement or adhesive, the openings 78 and 80 will be positioned over the screws 26 such that access to these screws will still be permitted with a conventional screwdriver. Finally, a central hole 82 extends down through the center of the device 70 through both of the elements 72 and 74. The diameter of the hole 82 is equal to the outer diameter of the rod 32 so that the latter can be inserted all the way into the hole 32 until the lower end of the rod touches the cover 20. With the rod 32 inserted all the way into the hole 82, the flag device 30 will be essentially in the same position as shown in FIGS. 1 and 2.

In all of the embodiments disclosed above, it is preferred that the center hole through the rubber plug be actually somewhat smaller than the outer diameter of the wire or rod 32 so that the wire is snugly received in the rubber plug to prevent dirt or other foreign material from getting inside the device.

One of the advantages of the present invention is that the flag support can be easily and quickly attached to the sprinkler head. The flag device is easily inserted into the flag support and is easily removed, if desired.

The flag support can be easily removed from the cover plate, as desired. The flag support does not damage or mar the surface of the cover plate.

The cover plate can be removed from the sprinkler head without having to remove the flag support.

The flag support of the present invention is inexpensive to manufacture and is attractive as well.

Whereas the present invention has been described in particular relation to the drawings attached hereto, other and further modifications, apart from those shown or suggested herein, may be made within the spirit and scope of this invention.

What is claimed is:

1. A flag support for a sprinkler head of the type having a cover plate attached to an internal supporting mechanism by means of one or more screws, the flag support being a two part device consisting of a lower member of plastic material and an upper member of rubber or plastic material which is more resilient and softer than the material of the lower plastic member, the upper rubber member being attachable to the lower plastic member, the plastic member being attachable to the cover plate by a suitable adhesive material and having therein holes of sufficient size and number to permit access to each screw on the cover plate by means of a conventional screwdriver without requiring the removal of the plastic member from the cover plate, the flag support having a center opening therein substantially equal in diameter to the diameter of the wire or rod of a flag device to be supported on the sprinkler head.

2. A flag support as set forth in claim 1 wherein the cover plate is attached to the supporting mechanism of the sprinkler head by a pair of screws, wherein the lower plastic member is a plastic disk having a pair of holes larger than the heads of the screws but concentrically arranged with respect to the screws, wherein the upper rubber member is provided with a pair of cylindrical projections which extend downwardly and which are received within the larger holes of the plastic disk.

3. A flag support as set forth in claim 1 wherein the cover plate is attached to the supporting mechanism of the sprinkler head by a pair of screws, wherein the upper rubber member is attached to the lower plastic member by a suitable adhesive and wherein the support is provided with a pair of opposite U-shaped openings which extend outwardly to the outer opposite edges of the support and which are positioned over the two screws in such a manner that there can be access to the two screws through a conventional screwdriver without removing the flag support from the cover plate.

4. A flag support as set forth in claim 1 wherein the cover plate is attached to the supporting mechanism of the sprinkler head by a single screw, wherein the lower plastic member is provided with a single central hole larger than the head of the screw but concentrically arranged with respect thereto, and wherein the upper rubber member is provided with a single central cylindrical projection which extends downwardly and which is received within the central hole of the plastic member, the center opening of the flag support extending downwardly through the upper rubber member and through the central cylindrical projection thereon.

* * * * *